United States Patent
Raghava et al.

(10) Patent No.: US 7,143,304 B2
(45) Date of Patent: Nov. 28, 2006

(54) METHOD AND APPARATUS FOR ENHANCING THE SPEED OF A SYNCHRONOUS BUS

(75) Inventors: Sharath Raghava, San Jose, CA (US); Kevin Normoyle, Santa Clara, CA (US); Christopher Furman, Gilroy, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 512 days.

(21) Appl. No.: 10/452,678

(22) Filed: May 30, 2003

(65) Prior Publication Data
US 2004/0243876 A1    Dec. 2, 2004

(51) Int. Cl.
*G06F 1/12* (2006.01)
(52) U.S. Cl. .................. 713/600; 713/400; 713/503
(58) Field of Classification Search .......... None
See application file for complete search history.

(56) References Cited
U.S. PATENT DOCUMENTS

| | | | |
|---|---|---|---|
| 4,430,745 A * | 2/1984 | Betts ........................ 375/377 |
| 5,852,608 A | 12/1998 | Csoppenszky et al. ...... 370/465 |
| 6,571,346 B1 | 5/2003 | Dreps et al. ................ 713/600 |
| 6,636,980 B1 * | 10/2003 | Gervais et al. ............. 713/600 |
| 6,792,554 B1 * | 9/2004 | Gervais et al. ............. 713/600 |
| 2002/0013875 A1 | 1/2002 | Dreps et al. ................ 710/305 |

OTHER PUBLICATIONS

Mobile Intel Pentium III Processor/440MX Chipset Platform Design Guide, Intel Corporation, May 2002, pp. 1-37. Retrieved on Nov. 16, 2004. Retrieved from the Internet:<URL:ftp://download.intel.com/design/chipsets/designex/27350402.pdf>.

* cited by examiner

*Primary Examiner*—Thuan Du
(74) *Attorney, Agent, or Firm*—Gunnison, McKay & Hodgson, L.L.P.; Lisa A. Norris (57) ABSTRACT

An apparatus for enhancing the speed of a synchronous bus includes a two register based FIFO with software control bits and a second clock signal. According to the invention, the second clock signal rd_clk is supplied by the same PLL that provides the main clock signal lg_clk. According to the invention, data is taken from the two registers in alternative clock cycles so that each of the register holds valid data for two clock cycles. A first software data bit is used to determine which of the two registers is unloaded first. Using the method and structure of the invention, the window for transferring valid data is increased and therefore the system employing the method and apparatus of the invention is more skew tolerant.

28 Claims, 4 Drawing Sheets

METHOD AND APPARATUS FOR ENHANCING THE SPEED OF A SYNCHRONOUS BUS

FIELD OF THE INVENTION

The present invention relates generally to bus design and, more particularly, to a method and apparatus for enhancing the speed of synchronous buses beyond their traditional limitations in a simple and efficient manner.

BACKGROUND OF THE INVENTION

At present, the vast majority of microprocessors and computer systems are synchronous systems that incorporate system clocks and "globally" synchronous buses. In particular, synchronous buses are presently, and most likely will be for some time, the buses of choice and several "standard" buses are known, and designed to, within the electronics industry. In the prior art, the speed at which data could be transmitted on a synchronous bus was limited by the inherent maximum latency between a source and a target within the system. In other words, the minimum time between transfers of data on a synchronous bus had to be greater than the maximum time it took to transmit a signal from a source to a target within the system to avoid significant skew between the clock and the data.

At relatively slow bus speeds, such as those below 100 MHZ, the fact that the maximum speed of the synchronous bus was limited by the maximum latency was not particularly problematic and could be dealt with using prior art methods. However, higher bus speeds, such as 200 MHZ, are rapidly becoming the norm and even greater bus speeds are being sought and developed for future systems. Unfortunately, these higher bus speeds mean that even small amounts of skew between the clock and the data can very problematic and can result in an asynchronous data flow. If not corrected, this situation results in increased system errors or system failure.

In some prior art systems, and particularly in SDRAM systems, single level First-In/First-Out (FIFO) circuits were employed. However, the use of single level FIFOs was only marginally successful because these systems were skew intolerant, generally inflexible and, when error was introduced, there was no recourse or correction mechanism. One prior art "fix" to the skew problem was to include a feedback clock and a single register to correct/control skew between data and the system clock. However, this "fix" proved of limited value because it was still based on a single level/single register solution and therefore lacked sufficient skew tolerance and flexibility.

Since limiting bus speeds to 100 MHZ or less is simply not an acceptable solution, designers have been forced to turn to complicated and expensive solutions such as new or highly modified, i.e., non-standard, buses, very deep and non-traditional FIFOs and complicated systems and solutions typically associated with experimental asynchronous systems. This has resulted in increased system complexity, non-standardization of systems and increased cost. To make matters worse, even these expensive and complicated solutions have met with very limited success and have therefore not been widely implemented.

What is needed is a method and apparatus to improve the performance of a standard synchronous bus such that the synchronous bus can transmit data at a rate faster than the traditional limit imposed by the maximum latency between a source and a target within the system, while, at the same time, providing system flexibility, adding minimum complexity and introducing minimum added logic latency.

SUMMARY OF THE INVENTION

According to the present invention, a method and apparatus for enhancing the speed of a synchronous bus includes providing a second clock signal, rd_clk, which is coupled to a synchronous bus speed enhancement circuit. The speed enhancement circuit is then used to hold valid data for multiple cycles of the second clock signal rd_clk. Consequently, using the method and structure of the invention, valid data is available for a longer time frame than it was available in prior art systems and valid data can be sent over a longer time interval to ensure sync between the data sent to a buffer, such as a fast-frame buffer (FFB), from a bus ASIC and the clock signal lg_clk, even in the presence of significant skew between the clock and the data. Therefore, a synchronous bus utilizing the method and structure of the invention can tolerate, and be adjusted to correct for, a data-to-clock skew of as much as a full cycle of the second clock signal rd_clk.

According to one embodiment of the invention, the second clock signal rd_clk is supplied by the same Phase-locked-loop (PLL) that provides the signal lg_clk. According to one embodiment of the invention, the speed enhancement circuit is comprised of a two register FIFO and valid data is sent to both registers. Then data is taken from one of the two registers in alternative clock cycles so that each register holds valid data for up to two clock cycles. The fact that, according to the this embodiment of the invention, each register contains valid data for up to two clock cycles means that valid data is available for up to twice the time that it was available in prior art single level FIFO systems. Consequently, data can be sent back to the FFB over a time interval twice that of the prior art systems and a synchronous bus utilizing the method and structure of the invention can therefore tolerate, and be adjusted to accommodate, a data-to-clock skew of up to a full clock cycle.

According to one embodiment of the invention, a first software data bit is used to determine which of the two registers is unloaded first. In this way, the data can be taken at an optimized interval. In addition, according to one embodiment of the invention, other software-controlled signals are used to indicate additional delay to provide even more skew tolerance.

Using the method and structure of the invention, the window for transferring valid data is increased and therefore the system employing the method and apparatus of the invention is more skew tolerant.

It is to be understood that both the foregoing general description and following detailed description are intended only to exemplify and explain the invention as claimed.

BRIEF DESCRIPTION OF THE DRAWINGS

The accompanying drawings, which are incorporated in, and constitute a part of this specification, illustrate embodiments of the invention and, together with the description, serve to explain the advantages and principles of the invention. In the drawings.

DETAILED DESCRIPTION

The invention will now be described in reference to the accompanying drawings. The same reference numbers may be used throughout the drawings and the following description to refer to the same or like parts.

Figure 1:
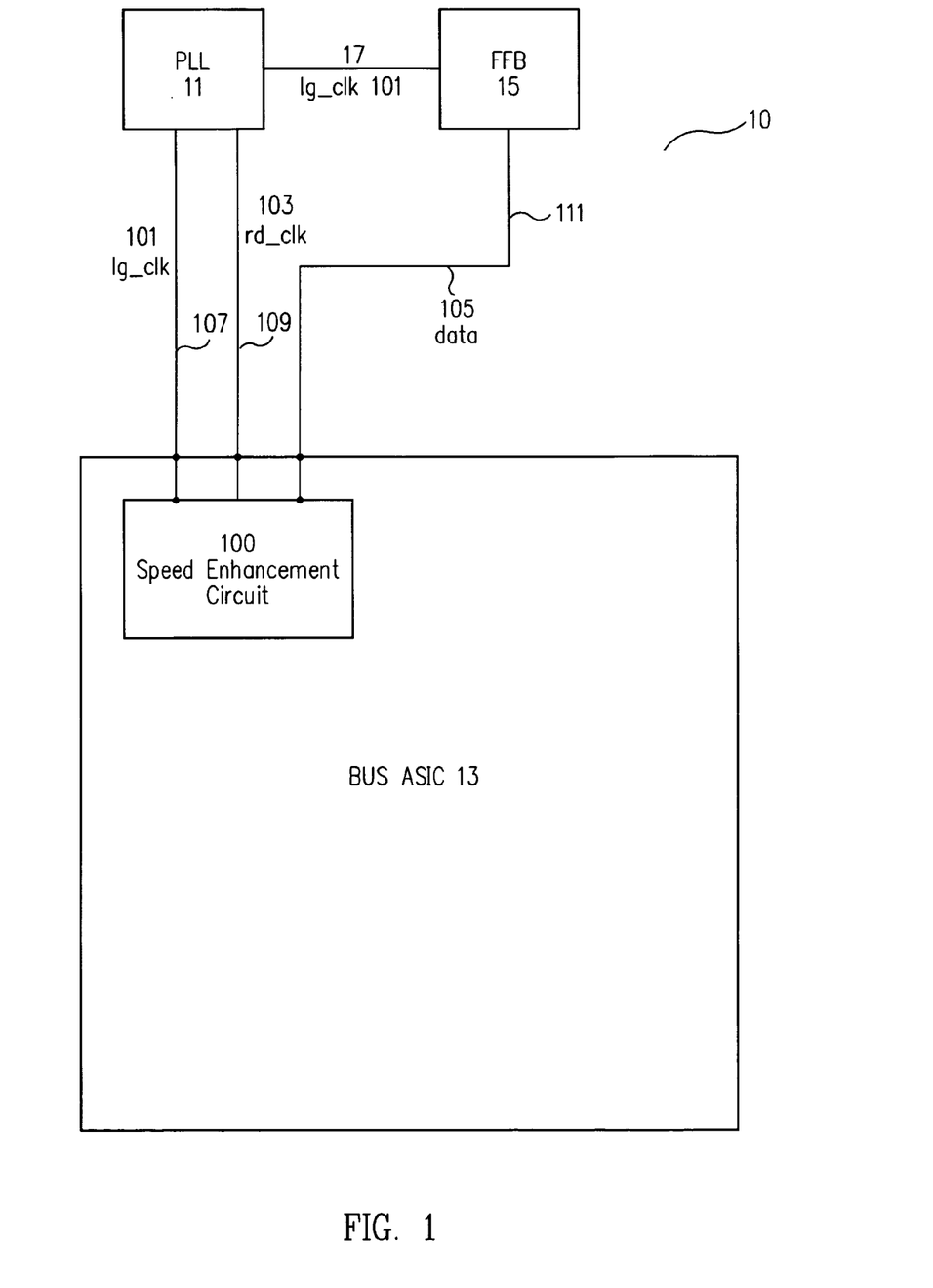
FIG. 1 shows one embodiment of a system employing a generalized speed enhancement circuit according to the principles of the present invention.
Figure 2A:
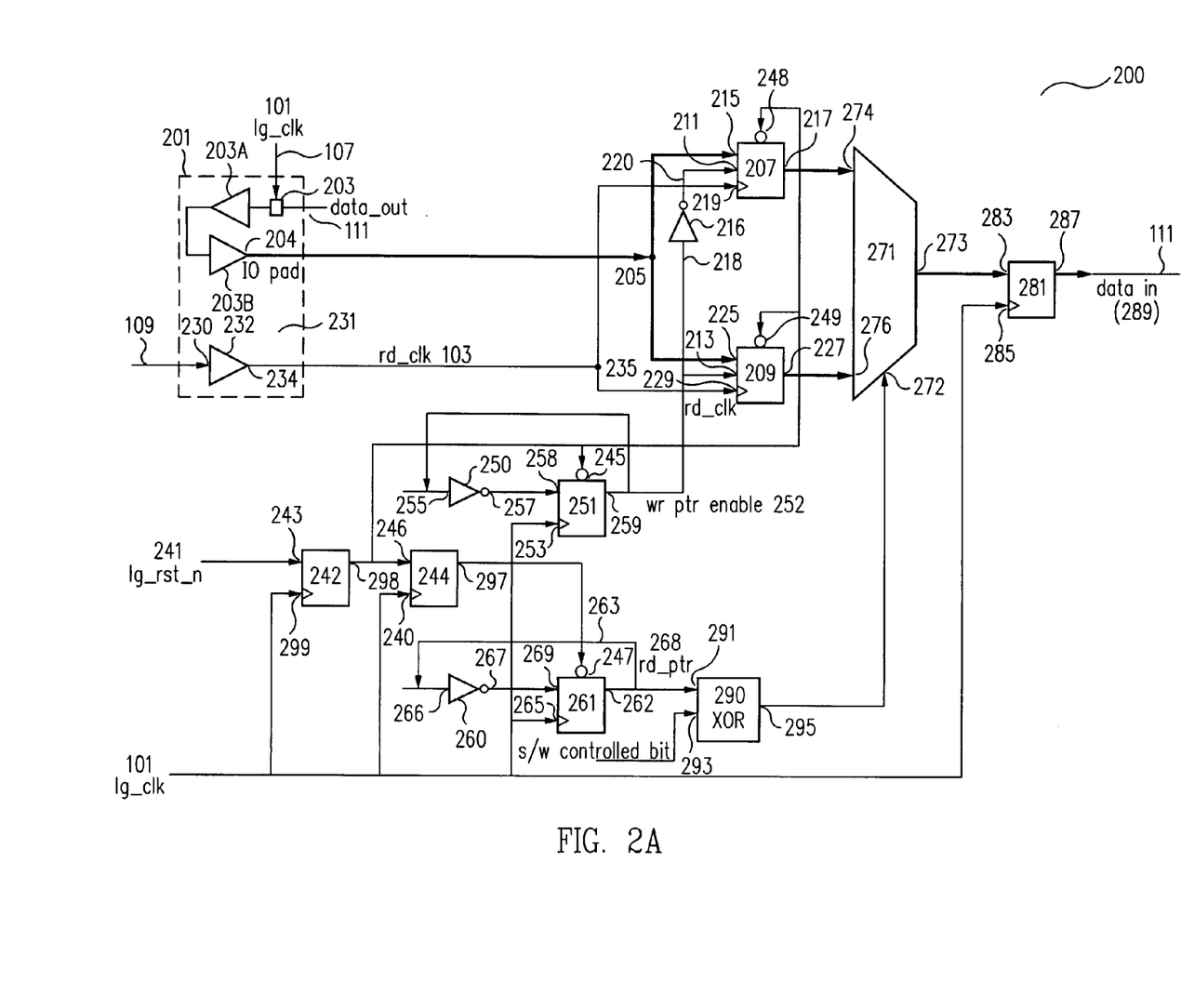
FIG. 2A shows one embodiment of a speed enhancement circuit designed in accordance with the principles of the present invention.
Figure 2B:
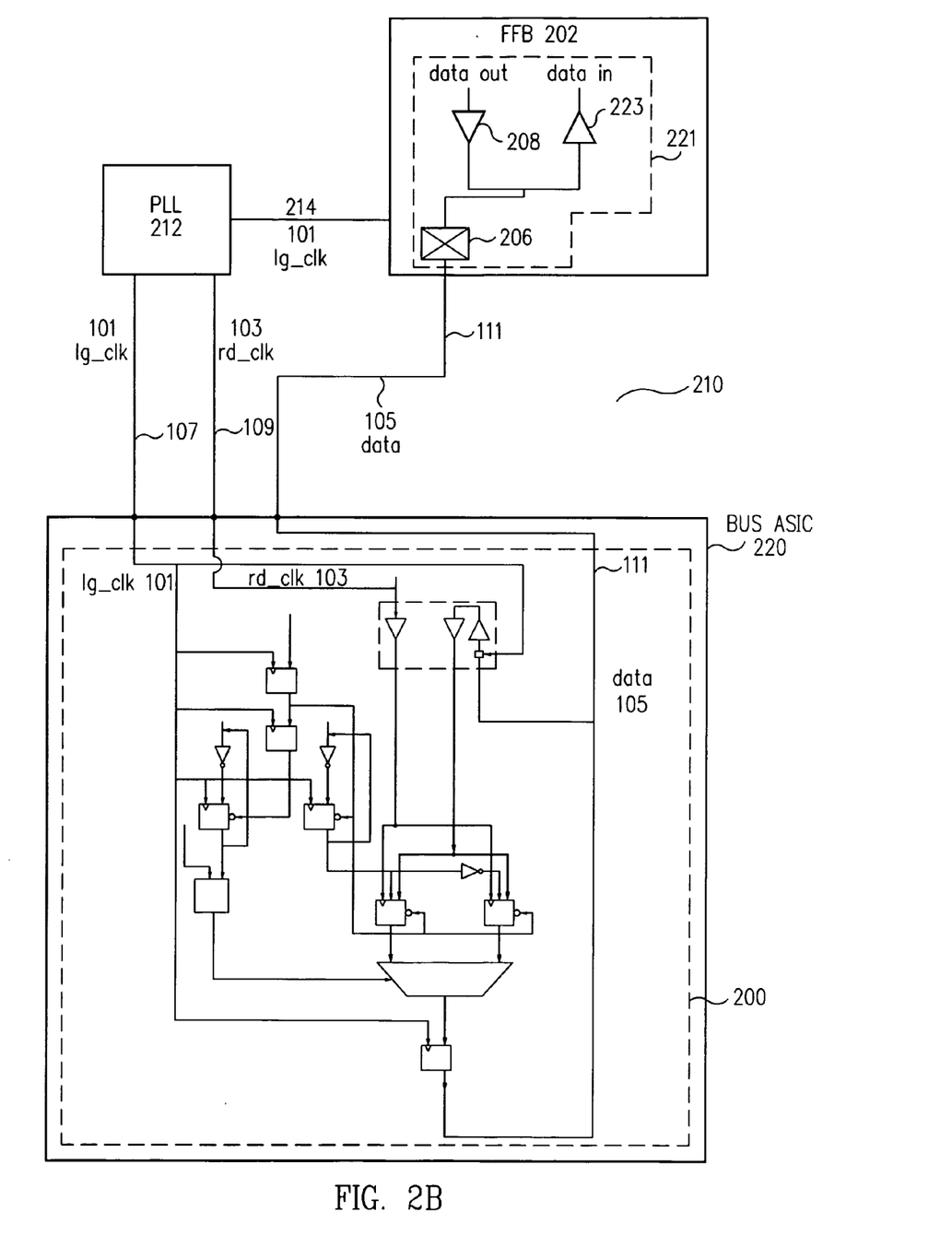
FIG. 2B shows one embodiment of a system employing the speed enhancement circuit of FIG. 2A designed in accordance with the principles of the present invention; and, FIG. 3 is one embodiment of a timing diagram for one embodiment of a speed enhancement circuit designed in accordance with the principles of the present invention.

According to the present invention, a method and apparatus for enhancing the speed of a synchronous bus (13 in FIG. 1 and 220 in FIG. 2B) includes providing a second clock signal rd_clk (103 in FIGS. 1, 2A, 2B and 3) that is coupled to a speed enhancement circuit (100 in FIG. 1 and 200 in FIGS. 2A and 2B). The speed enhancement circuit is then used to hold valid data for multiple clock cycles of the second clock signal rd_clk (see 351 and 353 in FIG. 3). Consequently, using the method and structure of the invention, valid data is available for a longer time frame than it was available in prior art systems and data can be sent back to a buffer, such as an FFB (15 in FIG. 1, and 202 in FIG. 2B) over a longer time interval (351 and 353 in FIG. 3) to ensure synchronicity between the data (105 FIGS. 1, 2B and 3) to the FFB and the first clock signal lg_clk (101 FIGS. 1, 2A, 2B and 3) even in the presence of significant skew between the clock and the data. Therefore, a synchronous bus utilizing the method and structure of the invention can tolerate, and be adjusted to correct for, a data-to-clock skew of at least a full clock cycle of the second clock signal rd_clk.

According to one embodiment of the invention, the second clock signal rd_clk (103 in FIGS. 2A and 2B) is supplied by the same PLL (212 in FIG. 2B) that provides the first clock signal lg_clk (101 in FIGS. 2A and 2B). According to one embodiment of the invention, a speed enhancement circuit (200 in FIGS. 2A and 2B) is comprised of a two register FIFO and data is taken from the two registers (207 and 209 in FIG. 2A) in alternative clock cycles so that each register holds valid data for up to two clock cycles (351 and 353 in FIG. 3). The fact that, according to the this embodiment of the invention, each register contains valid data for up to two clock cycles means that valid data is available for twice the time that it was available in prior art systems. Consequently, data can be sent back to a buffer, such as an FFB (202 in FIG. 2B), over a time interval (351 and 353 in FIG. 3) twice that of the prior art systems and a synchronous bus utilizing the method and structure of the invention can therefore accommodate, and be adjusted to tolerate, a data-to-clock skew of up to a full clock cycle.

According to one embodiment of the invention, a first software data bit (293 in FIG. 2A) is used to determine which of the two registers is unloaded first. In this way the data can be taken at an optimized interval.

FIG. 1 shows one embodiment of a system 10 designed according to the principles of the present invention. As shown in FIG. 1, system 10 includes: Phase-Locked-Loop 11 (PLL 11); Fast-Frame Buffer 15 (FFB 15); and Synchronous Bus Application Specific Integrated Circuit 13 (Bus ASIC 13). In one embodiment of the invention, Bus ASIC 13 includes speed enhancement circuit 100 designed according to the principles of the invention.

Signal lg_clk 101 is generated by PLL 11 and coupled to Bus ASIC 13 and speed enhancement circuit 100 by line 107. In addition, according to the invention, signal rd_clk 103 is also generated by PLL 11 and is also coupled to Bus ASIC 13 and speed enhancement circuit 100 by line 109. As shown in FIG. 1, line 17 couples PLL 11, and signal lg_clk 101, to FFB 15 and line 111 couples Bus ASIC 13 to FFB 15 for transmission of data 105 between Bus ASIC 13 and FFB 15.

As discussed above, signal lgclk 101 is coupled to both Bus ASIC 13, by line 107, and FFB 15, by line 17. Typically, the signal lg_clk 101 on line 107, arrives at Bus ASIC 13 at a slightly different time, i.e., out of sync or skewed, with respect to signal lg_clk 101 on line 17 to FFB 15. In other words, there is a skew between lg_clk 101 arriving at Bus ASIC 13 on line 107 and lg_clk 101 arriving at FFB 15 on line 17. As a result, in the prior art, and absent the present invention, there was typically a skew between data 105 on line 111 and the signal lg_clk 101. This skew can result in missed data and system 10 failure. However, according to the invention, signal rd_clk 103 is provided by PLL 11 and is also coupled to speed enhancement circuit 100. Then according to the invention, speed enhancement circuit 100 is used to hold valid data for multiple clock cycles of signal rd_clk 103. Consequently, using the method and structure of the invention, signal lg_clk 101 on line 107 and signal lg_clk 101 on line 17 can be re-synchronized and valid data made available for a longer time frame than it was available in prior art systems. Consequently, data can be sent back to the FFB 15 over a longer time interval to ensure sync between data 105 to FFB 15 and signal lg_clk 101 even in the presence of significant skew between signal lg_clk 101 and data 105. Therefore, a system 10 utilizing the method and structure of the invention can tolerate, and be adjusted to correct for, a data 105-to-signal lg_clk 101 skew of at least a full clock cycle of signal rd_clk 103.

The operation and interaction of one embodiment speed enhancement circuit 100 and signal rd_clk 103 are explained in more detail below with respect to FIG. 2A.

FIG. 2A shows a speed enhancement circuit 200, designed in accordance with the principles of the present invention, which represents one possible embodiment of speed enhancement circuit 100 of FIG. 1. As seen in FIG. 2A, in one embodiment of the invention, speed enhancement circuit 200 includes: I/O pad 201; first register 207; second register 209; multiplexor 271 (MUX 271); first reset flip-flop 242; second reset flip-flop 244; write pointer enable flip-flop 251; read pointer flip-flop 261; exclusive OR gate 290 (XOR 290) and data-in flip-flop 281.

As seen in FIG. 2A, according to one embodiment of the invention, signal lg_clk 101 is coupled to I/O pad 201 at terminal 203 by line 107. Terminal 203 is coupled to I/O pad driver 203A and I/O pad receiver 203B. The output 204 of I/O pad receiver 203B is then coupled to junction 205. Junction 205 is, in turn, coupled to supply the same data to both data input terminal 215 of first register 207 and data input terminal 225 of second register 209. As also seen in FIG. 2A, signal rd_clk 103 is coupled to I/O pad 201 and input 230 of I/O pad receiver 232. Output terminal 234 of I/O pad receiver 232 is coupled to junction 235. Junction 235 is coupled to read input terminal 219 of first register 207 and read input terminal 229 of second register 209.

Signal lg_clk 101 is also coupled to: clock input terminal 299 of first reset flip-flop 242; clock input terminal 240 of second reset flip-flop 244; clock input terminal 265 of read pointer flip-flop 261; clock input terminal 253 of write pointer enable flip-flop 251 and clock input terminal 285 of data-in flip-flop 281.

A signal lg_rst_n 241 is coupled to terminal 243 of first reset flip-flop 242. Output terminal 298 of first reset flip-flop 242 is coupled to: terminal 246 of second reset flip-flop 244; reset terminal 248 of first register 207; and reset terminal 249 of second register 209. Output terminal 297 of second reset flip-flop 244 is coupled to reset terminal 247 of read pointer flip-flop 261.

Output terminal 257 of inverter 250 is coupled to terminal 258 of write pointer enable flip-flop 251. Output terminal 259 of write pointer enable flip-flop 251 carries signal wr_ptr_enable 252 that is coupled to: input 255 of inverter 250 in a feedback loop; input 213 of second register 209; and input 218 of inverter 216. Output 220 of inverter 216 then supplies the inverted signal wr_ptr_enable 252 to terminal 211 of first register 207.

Output terminal 267 of inverter 260 is coupled terminal 269 of read pointer flip-flop 261. Output 262 of read pointer flip-flop 261 couples signal rd_ptr 268 to input 291 of XOR 290 and input terminal 266 of inverter 260 in a feedback loop. XOR 290 includes second input 293 coupled to receive a software controlled bit which, according to the invention, determines whether data is taken first from first register 207 or first from second register 209 as discussed in more detail below.

In one embodiment of the invention, both signals wr_ptr_enable 252 and rd_ptr 268 are software controlled, thereby giving speed enhancement circuit increased operational and correctional flexibility to accommodate additional delays and variances in board level and circuit level operational and design parameters.

Output terminal 217 of first register 207 is coupled to first input terminal 274 of MUX 271. Output terminal 227 of second register 209 is coupled to second input terminal 276 of MUX 271. Output terminal 295 of XOR 290 is coupled to select input 272 of MUX 271. Output terminal 273 of MUX 271 is coupled to data input 283 of data-in flip-flop 281. Output terminal 287 of data-in flip-flop 281 carries signal data_in 289.

FIG. 2B shows one embodiment of a system 210 employing the one embodiment of speed enhancement circuit 200 shown in FIG. 2A. As shown in FIG. 2B, system 210 includes: Phase-Locked Loop 212 (PLL 212); Fast-Frame Buffer 202 (FFB 202); and Synchronous Bus Application Specific Integrated Circuit 220 (Bus ASIC 220). In one embodiment of the invention, Bus ASIC 220 includes speed enhancement circuit 200 designed according to the principles of the invention and shown in detail in FIG. 2A.

Signal lg_clk 101 is generated by PLL 212 and coupled to Bus ASIC 220 and speed enhancement circuit 200 by line 107. In addition, according to the invention, signal rd_clk 103 is also generated by PLL 212 and is also coupled to Bus ASIC 220 and speed enhancement circuit 200 by line 109. As also shown in FIG. 2B, line 214 couples PLL 212 and signal lg_clk 101 to FFB 202, and line 111 couples Bus ASIC 220 to FFB 202 for transmission of data signal 105 between Bus ASIC 220 and I/O pad 221 of FFB 202. I/O pad 221 includes receiver 223, driver 208 and terminal 206.

As seen in FIG. 2B, signal lg_clk 101 is coupled to both Bus ASIC 220, by line 107, and FFB 202, by line 214. As discussed above, typically, the signal lg_clk 101 on line 107, arrives at Bus ASIC 220 at a slightly different time, i.e., out of sync or skewed, with respect to the signal lg_clk 101 on line 214 to FFB 202. In other words, there is a skew between lg_clk 101 arriving at Bus ASIC 220 on line 107 and lg_clk 101 arriving at FFB 202 on line 214. As a result, in the prior art, and absent the present invention, there was typically a skew between data 105 on line 111 and the signal lg_clk 101.

This skew can result in missed data and system failure. However, according to the invention, signal rd_clk 103 is provided by PLL 212 and is also coupled to speed enhancement circuit 200. Then according to the invention, speed enhancement circuit 200 is used to hold valid data for two clock cycles of signal rd_clk 103 by employing the two registers 207 and 209. Consequently, using the method and structure of the invention, the signal lg_clk 101 on line 107 and lg_clk 101 on line 214 can be re-synchronized and valid data is available for a longer time frame, up to twice as long, than it was available in prior art systems. Consequently, data can be sent back to the FFB 202 over a longer time interval to ensure sync between data 105 to FFB 202 and signal lg_clk 101 even in the presence of significant skew between signal lg_clk 101 and data 105. Therefore, system 210 utilizing the method and structure of the invention can tolerate, and be adjusted to correct for, a data 105-to-clock signal 101 skew of up to a full clock cycle of signal rd_clk 103.

Viewing FIGS. 2A and 2B together, as discussed above, according to the one embodiment of the invention shown in FIG. 2A and FIG. 2B, speed enhancement circuit 200 is comprised of a two register FIFO and data is taken from the two registers 207 and 209 in alternative cycles of signal rd_clk 103 so that each register 207 and 209 holds valid data for up to two cycles of signal rd_clk 103, i.e., two cycles of signal lg_clk 101. The fact that, according to this embodiment of the invention, each register contains valid data for up to two clock cycles means that valid data is available for twice the time that it was available in prior art systems. Consequently, data can be sent back to FFB 202 over a time interval twice that of the prior art systems and a synchronous Bus ASIC, such as Bus ASIC 220 in FIG. 2B, utilizing speed enhancement circuit 200 can therefore tolerate, and be adjusted to tolerate, a data-to-clock skew of up to a full clock cycle.

As discussed above, according to one embodiment of the invention, a first software data bit is coupled to input terminal 293 of XOR 290 and is used to determine which of the two registers 207 or 209 is unloaded first. In this way the data can be taken at an optimized interval for data 105.

As shown in FIG. 2B, as in FIG. 2A, output terminal 217 of first register 207 is coupled to first input terminal 274 of MUX 271. Output terminal 227 of second register 209 is coupled to second input terminal 276 of MUX 271. Output terminal 295 of XOR 290 is coupled to select input 272 of MUX 271. Output terminal 273 of MUX 271 is coupled to data input 283 of data-in flip-flop 281. Output terminal 287 of data-in flip-flop 281 carries signal data_in 289 to I/O pad 221 of FFB 202 on line 111.

Using the structure of the invention shown in FIG. 2A, the window for transferring valid data is increased and therefore the system employing the method and apparatus of the invention is more skew tolerant. The operation of one embodiment of speed enhancement circuit 200 is seen in more detail by viewing both FIG. 2A and FIG. 3 together.

Figure 3:
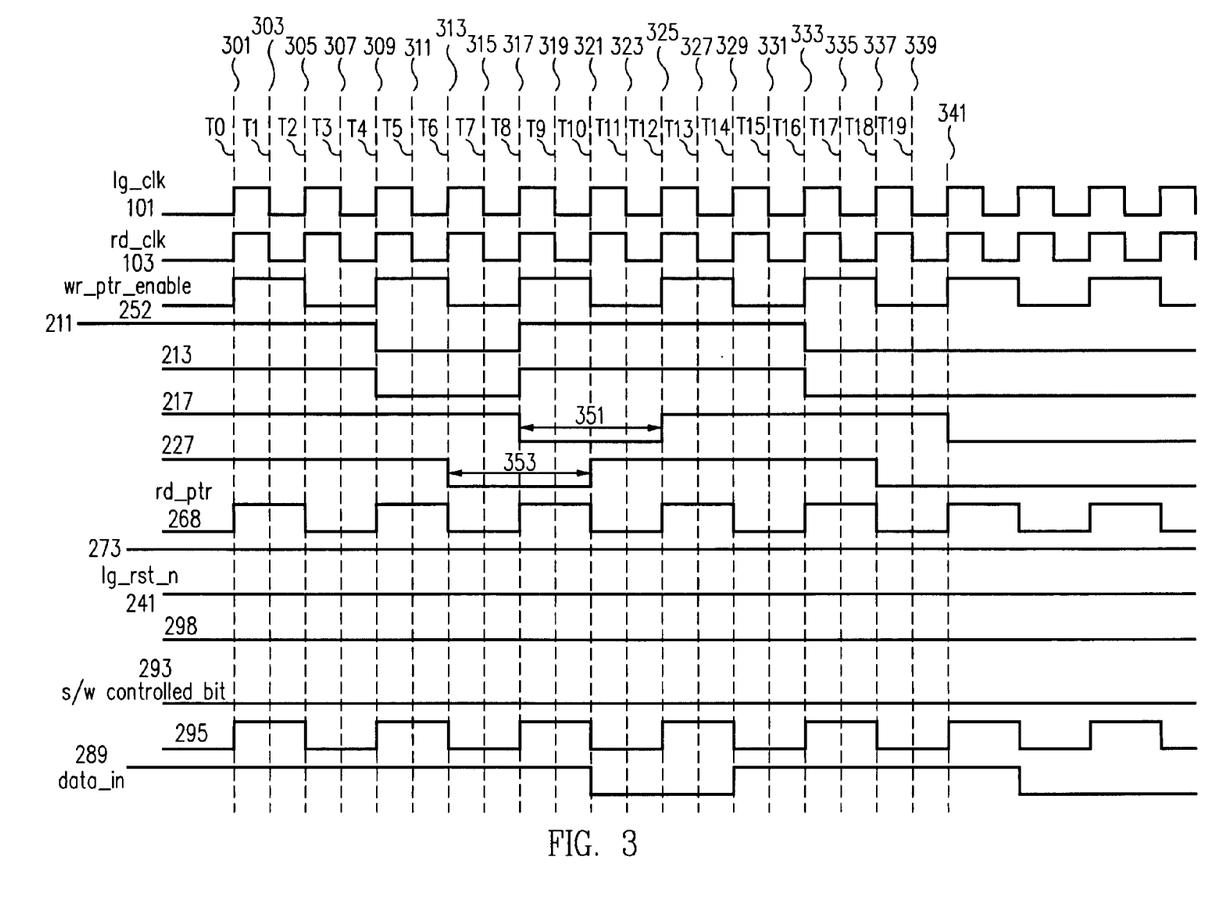

FIG. 3 is one embodiment of a timing diagram for a speed enhancement circuit 200 designed in accordance with the principles of the present invention. The following signals are shown in FIG. 3, at times T1 to T19, i.e., points 301 to 341: the signal lg_clk 101; the signal rd_clk 103; the signal wr_ptr_enable 252; the signal at input terminal 211 of first register 207; the signal at input terminal 213 of second register 209; the signal at output terminal 217 of first register 207; the signal at output terminal 227 of second register 209; the signal rd_ptr 268; the signal at output terminal 273 of MUX 271; the signal lg_rst_n 241; the signal at output terminal 298 of first reset flip-flop 242; the S/W controlled bit signal at input terminal 293 of XOR 290; the signal at output terminal 295 of XOR 290; and the signal data_in at output terminal 287 of output flip-flop 281.

Of particular note in FIGS. 2A, 2B and 3 is the signal at output terminal 217 of first register 207 and the signal at output terminal 227 of second register 209. Referring to FIG. 3, it is seen that data is held valid at output terminal 217 of first register 207 for interval 351 that is equal to two cycles of signal rd_clk 103. Likewise, as seen in FIG. 3, data is held valid at output terminal 227 of second register 209 for interval 353 that is equal to two cycles of signal rd_clk 103. It is in this manner that, in the one embodiment of speed enhancement circuit 200 shown in FIGS. 2A and 2B, that each register 207 and 209 holds valid data for up to two cycles of signal rd_clk 103, i.e., two cycles of signal lg_clk 101, and then data is taken from the two registers 207 and 209 in alternative cycles of signal rd_clk 103.

In addition, as seen in FIG. 3, the signal at input terminal 293 of exclusive OR gate 290 (FIG. 2A) is low, thereby dictating that, in this first example, data is taken from first register 207 first, at interval 351, and the from second register 209 second, at interval 353. However, if conditions had dictated so, the signal at input terminal 293 of exclusive OR gate 290 (FIG. 2A) could have been made high, thereby dictating that data be taken from second register 209 first and the from first register 207 second. In this manner, the present invention provides flexibility as to what point in the data packet the data is taken; thereby ensuring stable and correct data.

As discussed above, in one embodiment of the invention, both signals wr_ptr_enable 252 and rd_ptr 268 are software controlled, thereby giving speed enhancement circuit 200 increased operational and correctional flexibility to accommodate additional delays and variances in board level and circuit level operational and design parameters.

As shown above, according to the present invention, a method and apparatus for enhancing the speed of a synchronous bus includes providing a second clock signal rd_clk that is coupled to a speed enhancement circuit. The speed enhancement circuit is then used to hold valid data for multiple clock cycles of the second clock signal rd_clk. Consequently, using the method and structure of the invention, valid data is available for a longer time frame than it was available in prior art systems and data can be sent back over a longer time interval to ensure synchronicity between the data and the clock even in the presence of significant skew between the clock and the data. Therefore, a synchronous bus utilizing the method and structure of the invention can tolerate, and be adjusted to correct for, a data-to-clock skew of at least a full clock cycle of the second clock signal rd_clk.

According to one embodiment of the invention, the second clock signal rd_clk is supplied by the same PLL that provides the signal lg_clk. According to one embodiment of the invention, a synchronous bus speed enhancement circuit is comprised of a two register FIFO and data is taken from the two registers in alternative clock cycles so that each register holds valid data for up to two clock cycles. The fact that, according to the this embodiment of the invention, each register contains valid data for up to two clock cycles means that valid data is available for twice the time that it was available in prior art systems. Consequently, data can be sent back to an FFB over a time interval twice that of the prior art systems and a synchronous bus utilizing the method and structure of the invention can therefore accommodate, and be adjusted to tolerate, a data-to-clock skew of up to a full clock cycle.

As also discussed above, according to one embodiment of the invention, a signal wr_ptr_enable and a signal rd_ptr are generated and are software controlled, thereby giving the speed enhancement circuit of the invention increased operational and correctional flexibility to accommodate additional delays and variances in board level and circuit level operational and design parameters.

Using the method and structure of the invention, the window for transferring valid data is increased and therefore the system employing the method and apparatus of the invention is more skew tolerant.

The foregoing description of an implementation of the invention has been presented for purposes of illustration and description only, and therefore is not exhaustive and does not limit the invention to the precise form disclosed. Modifications and variations are possible in light of the above teachings or may be acquired from practicing the invention. Consequently, the scope of the invention is defined by the claims and their equivalents.

What is claimed is:

1. A synchronous bus system comprising:
   a phase-locked loop (PLL);
   a buffer element;
   a Bus Application Specific Integrated Circuit (Bus ASIC), said Bus ASIC including a speed enhancement circuit;
   said PLL being coupled to said speed enhancement circuit such that a first clock signal is provided to said speed enhancement circuit by said PLL;
   said PLL being coupled to said speed enhancement circuit such that a second clock signal is provided to said speed enhancement circuit by said PLL;
   said PLL being coupled to said buffer element such that said first clock signal is provided to said buffer element by said PLL; and
   said buffer element being coupled to said speed enhancement circuit such that data is transferred between said buffer element and said speed enhancement circuit, wherein;
   said data is held in said speed enhancement circuit for at least two cycles of said second clock signal.

2. The synchronous bus system of claim 1, wherein; said speed enhancement circuit is a First-In/First-Out circuit (FIFO).

3. The synchronous bus system of claim 2, wherein;
   said FIFO comprises two registers, a first register and a second register.

4. The synchronous bus system of claim 3, wherein;
   said first clock signal is a signal lg_clk; and
   said second clock signal is a signal rd_clk.

5. The synchronous bus system of claim 4, wherein;
   data is coupled to each of said first register and said second register of said FIFO and is held in each of said first register and said second register of said FIFO for two cycles of said signal rd_clk.

6. The synchronous bus system of claim 5, wherein;
   data is taken from one of said first register or said second register of said FIFO, alternatively, each cycle.

7. The synchronous bus system of claim 6, wherein;
   said speed enhancement circuit includes a software controlled bit for programmably determining whether data is taken first from said first register or first from said second register of said FIFO.

8. The synchronous bus system of claim 7, wherein;
   said buffer element is a fast-frame buffer.

9. The synchronous bus system of claim 8, wherein;
said Bus ASIC is a Universal Port Architecture (UPA) Bus ASIC.
10. A synchronous bus system comprising:
a phase-locked loop (PLL);
a fast frame buffer;
a Bus Application Specific Integrated Circuit (Bus ASIC), said Bus ASIC including a speed enhancement circuit, said speed enhancement circuit comprising a First-In/First-Out circuit (FIFO), said FIFO comprising a first register and a second register;
said PLL being coupled to said speed enhancement circuit such that a first clock signal, lg_clk, is provided to said speed enhancement circuit by said PLL;
said PLL being coupled to said speed enhancement circuit such that a second clock signal, rd_clk, is provided to said speed enhancement circuit by said PLL;
said PLL being coupled to said fast-frame buffer such that said first clock signal is provided to said fast-frame buffer by said PLL; and
said fast-frame buffer being coupled to said speed enhancement circuit such that data is transferred between said fast-frame buffer and said speed enhancement circuit, wherein;
said data is coupled to each of said first register and said second register of said FIFO of said speed enhancement circuit and is held in each of said first register and said second register of said FIFO for two cycles of said signal rd_clk, further wherein;
said data is taken from one of said first register or said second register of said FIFO, alternatively, each cycle of said first clock signal.
11. The synchronous bus system of claim 10, wherein;
said speed enhancement circuit includes a software controlled bit for programmably determining whether data is taken first from said first register or first from said second register of said FIFO.
12. The synchronous bus system of claim 11, wherein;
said Bus ASIC is a Universal Port Architecture (UPA) Bus ASIC.
13. A synchronous bus system comprising:
a first clock signal;
a second clock signal;
a buffer element;
a Bus Application Specific Integrated Circuit (Bus ASIC), said Bus ASIC including a speed enhancement circuit;
said first clock signal being coupled to said speed enhancement circuit;
said second clock signal being coupled to said speed enhancement circuit;
said first clock signal being coupled to said buffer element; and
said buffer element being coupled to said speed enhancement circuit such that data is transferred between said buffer element and said speed enhancement circuit, wherein;
said data is held in said speed enhancement circuit for at least two cycles of said second clock signal.
14. A synchronous bus system comprising:
a first clock signal;
a second clock signal;
a fast frame buffer;
a Bus Application Specific Integrated Circuit (Bus ASIC), said Bus ASIC including a speed enhancement circuit, said speed enhancement circuit comprising a First-In/First-Out circuit (FIFO), said FIFO comprising a first register and a second register;
said first clock signal being coupled to said speed enhancement circuit;
said second clock signal being to coupled said speed enhancement;
said first clock signal being coupled to said fast-frame buffer; and
said fast-frame buffer being coupled to said speed enhancement circuit such that data is transferred between said fast-frame buffer and said speed enhancement circuit, wherein;
said data is coupled to each of said first register and said second register of said FIFO of said speed enhancement circuit and is held in each of said first register and said second register of said FIFO for two cycles of said second clock signal, further wherein;
said data is taken from one of said first register or said second register of said FIFO, alternatively, each cycle of said first clock signal.
15. A method for enhancing the speed of a synchronous bus system comprising:
providing a phase-locked loop (PLL);
providing a buffer element;
providing a Bus Application Specific Integrated Circuit (Bus ASIC), said Bus ASIC including a speed enhancement circuit;
coupling said PLL to said speed enhancement circuit such that a first clock signal is provided to said speed enhancement circuit by said PLL;
coupling said PLL to said speed enhancement circuit such that a second clock signal is provided to said speed enhancement circuit by said PLL;
coupling said PLL to said buffer element such that said first clock signal is provided to said buffer element by said PLL;
coupling said buffer element to said speed enhancement circuit such that data is transferred between said buffer element and said speed enhancement circuit; and
holding said data in said speed enhancement circuit for at least two cycles of said second clock signal.
16. The method for enhancing the speed of a synchronous bus system of claim 15, wherein;
said speed enhancement circuit is a First-In/First-Out circuit (FIFO).
17. The method for enhancing the speed of a synchronous bus system of claim 16, wherein;
said FIFO comprises two registers, a first register and a second register.
18. The method for enhancing the speed of a synchronous bus system of claim 17, wherein;
said first clock signal is a signal lg_clk; and
said second clock signal is a signal rd_clk.
19. The method for enhancing the speed of a synchronous bus system of claim 18, further comprising;
coupling data to each of said first register and said second register of said FIFO; and
holding said data in each of said first register and said second register of said FIFO for two cycles of said signal rd_clk.
20. The method for enhancing the speed of a synchronous bus system of claim 19, further comprising;
taking data from one of said first register or said second register of said FIFO, alternatively, each cycle of said first clock signal, lg_clk.
21. The method for enhancing the speed of a synchronous bus system of claim 20, wherein;
said speed enhancement circuit includes a software controlled bit for programmably determining whether data is taken first from said first register or first from said second register of said FIFO.

22. The method for enhancing the speed of a synchronous bus system of claim 21, wherein;
said buffer element is a fast-frame buffer.

23. The method for enhancing the speed of a synchronous bus system of claim 22, wherein;
said Bus ASIC is a Universal Port Architecture (UPA) Bus ASIC.

24. A method for enhancing the speed of a synchronous bus system comprising:
providing a phase-locked loop (PLL);
providing a fast frame buffer;
providing a Bus Application Specific Integrated Circuit (Bus ASIC), said Bus ASIC including a speed enhancement circuit, said speed enhancement circuit comprising a First-In/First-Out circuit (FIFO), said FIFO comprising a first register and a second register;
coupling said PLL to said speed enhancement circuit such that a first clock signal, lg_clk, is provided to said speed enhancement circuit by said PLL;
coupling said PLL to said speed enhancement circuit such that a second clock signal, rd_clk, is provided to said speed enhancement circuit by said PLL;
coupling said PLL to said fast-frame buffer such that said first clock signal is provided to said fast-frame buffer by said PLL;
coupling fast-frame buffer to said speed enhancement circuit such that data is transferred between said fast-frame buffer and said speed enhancement circuit;
coupling said data to each of said first register and said second register of said FIFO of said speed enhancement circuit;
holding said data in each of said first register and said second register of said FIFO for two cycles of said signal rd_clk; and
taking said data from one of said first register or said second register of said FIFO, alternatively, each cycle of said first clock signal.

25. The method for enhancing the speed of a synchronous bus system of claim 24, wherein;
said speed enhancement circuit includes a software controlled bit for programmably determining whether data is taken first from said first register or first from said second register of said FIFO.

26. The method for enhancing the speed of a synchronous bus system of claim 25, wherein;
said Bus ASIC is a Universal Port Architecture (UPA) Bus ASIC.

27. A method for enhancing the speed of a synchronous bus system comprising:
providing a first clock signal;
providing a second clock signal;
providing a buffer element;
providing a Bus Application Specific Integrated Circuit (Bus ASIC), said Bus ASIC including a speed enhancement circuit;
coupling said first clock signal to said speed enhancement circuit;
coupling said second clock signal to said speed enhancement circuit;
coupling said first clock signal to said buffer element;
coupling said buffer element to said speed enhancement circuit such that data is transferred between said buffer element and said speed enhancement circuit; and
holding said data in said speed enhancement circuit for at least two cycles of said second clock signal.

28. A method for enhancing the speed of a synchronous bus system comprising:
providing a first clock signal;
providing a second clock signal;
providing a fast frame buffer;
providing a Bus Application Specific Integrated Circuit (Bus ASIC), said Bus ASIC including a speed enhancement circuit, said speed enhancement circuit comprising a First-In/First-Out circuit (FIFO), said FIFO comprising a first register and a second register;
coupling said first clock signal to said speed enhancement circuit;
coupling said second clock signal to said speed enhancement circuit;
coupling said first clock signal to said fast-frame buffer;
coupling said fast-frame buffer to said speed enhancement circuit such that data is transferred between said fast-frame buffer and said speed enhancement circuit;
coupling said data to each of said first register and said second register of said FIFO of said speed enhancement circuit;
holding said data in each of said first register and said second register of said FIFO for two cycles of said second clock signal; and taking said data from one of said first register or said second register of said FIFO, alternatively, each cycle of said first clock signal.

* * * * *

UNITED STATES PATENT AND TRADEMARK OFFICE
CERTIFICATE OF CORRECTION

PATENT NO. : 7,143,304 B2  Page 1 of 1
APPLICATION NO. : 10/452678
DATED : November 28, 2006
INVENTOR(S) : Raghava et al.

It is certified that error appears in the above-identified patent and that said Letters Patent is hereby corrected as shown below:

Column 10
In Claim 14, at line 4, after "enhancement", insert --circuit--.

Column 11
In Claim 24, at line 28, after "coupling", insert --said--.

Signed and Sealed this

Twenty-seventh Day of February, 2007

JON W. DUDAS
*Director of the United States Patent and Trademark Office*